(12) United States Patent
Wang et al.

(10) Patent No.: US 12,442,464 B2
(45) Date of Patent: Oct. 14, 2025

(54) ELECTRIC VALVE

(71) Applicant: ZHEJIANG SANHUA AUTOMOTIVE COMPONENTS CO., LTD., Zhejiang (CN)

(72) Inventors: Jundong Wang, Zhejiang (CN); Yangjun Zhao, Zhejiang (CN); Qikai Bian, Zhejiang (CN); Haitao Chen, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 37 days.

(21) Appl. No.: 18/560,389

(22) PCT Filed: May 12, 2022

(86) PCT No.: PCT/CN2022/092445
§ 371 (c)(1),
(2) Date: Nov. 12, 2023

(87) PCT Pub. No.: WO2022/237869
PCT Pub. Date: Nov. 17, 2022

(65) Prior Publication Data
US 2024/0229960 A1    Jul. 11, 2024

(30) Foreign Application Priority Data

May 13, 2021    (CN) .......................... 202110523047.6
Aug. 9, 2021    (CN) .......................... 202110906320.3

(51) Int. Cl.
*F16K 31/04*    (2006.01)
*F16K 5/06*    (2006.01)
(Continued)

(52) U.S. Cl.
CPC .............. *F16K 31/045* (2013.01); *F16K 5/06* (2013.01); *F16K 5/0642* (2013.01); *F16K 5/08* (2013.01);
(Continued)

(58) Field of Classification Search
CPC ........ F16K 31/045; F16K 5/06; F16K 5/0642; F16K 5/08; F16K 27/067; F16K 31/041; F16K 31/535; F16K 5/0647
(Continued)

(56) References Cited

U.S. PATENT DOCUMENTS 3,202,166 A * 8/1965 Butler .................. F16K 5/0478
                                                    251/317
5,540,414 A    7/1996 Giordani
(Continued)

FOREIGN PATENT DOCUMENTS

CN    104329480 A    2/2015
CN    110067887 A    7/2019
(Continued)

OTHER PUBLICATIONS

International Search Report for PCT/CN2022/092445 mailed Aug. 11, 2022, ISA/CN.
(Continued)

*Primary Examiner* — John Bastianelli
(74) *Attorney, Agent, or Firm* — Yue (Robert) Xu; Apex Attorneys at Law, LLP

(57) ABSTRACT

An electric valve, includes a transmission mechanism, a valve core, and a valve body assembly. The valve body assembly is provided with a valve body cavity, the valve core is located in the valve body cavity, and the transmission mechanism is transmissionally connected to the valve core. The electric valve further comprises a connecting seat, which is fixedly connected to the valve body assembly, and
(Continued)

the transmission mechanism comprises an output shaft; the electric valve further comprises a limiting frame, which is located on the radial outer circumference of the output shaft and is fixedly connected to the output shaft, the limiting frame being located on a side of the connecting seat relatively close to the valve core, and the limiting frame and the connecting seat being arranged opposite to each other and having a preset gap.

13 Claims, 5 Drawing Sheets

(51) Int. Cl.
    *F16K 5/08*     (2006.01)
    *F16K 27/06*    (2006.01)
    *F16K 31/53*    (2006.01)

(52) U.S. Cl.
    CPC .......... *F16K 27/067* (2013.01); *F16K 31/041* (2013.01); *F16K 31/535* (2013.01); *F16K 5/0647* (2013.01)

(58) Field of Classification Search
    USPC ..... 251/129.11–129.13, 304–317.1, 284–288
    See application file for complete search history.

(56) References Cited

U.S. PATENT DOCUMENTS

| | | | |
|---|---|---|---|
| 6,681,799 B2* | 1/2004 | Gagnon | F02M 26/70 137/554 |
| 7,325,782 B2* | 2/2008 | Gebler | F16K 31/003 251/293 |
| 2005/0183705 A1* | 8/2005 | Nanba | F02M 26/50 123/568.24 |
| 2022/0228671 A1 | 7/2022 | Wu et al. | |

FOREIGN PATENT DOCUMENTS

| | | |
|---|---|---|
| CN | 212177921 U | 12/2020 |
| CN | 112161080 A | 1/2021 |
| CN | 212429824 U | 1/2021 |
| CN | 215059663 U | 12/2021 |
| JP | 07317929 A | 12/1995 |
| WO | 2020253480 A1 | 12/2020 |

OTHER PUBLICATIONS

Japanese office action issued on Sep. 3, 2024 for the Japanese counterpart application No. 2023-569740.
European Search Report issued on Jan. 15, 2025 for the European counterpart application No. 22806831.8.

* cited by examiner

ELECTRIC VALVE

This application is a National Phase entry of PCT Application No. PCT/CN2022/092445, filed on May 12, 2022, which claims priorities to Chinese Patent Application No. 202110523047.6, titled "ELECTRIC VALVE", filed on May 13, 2021 with the China National Intellectual Property Administration, and Chinese Patent Application No. 202110906320.3 titled "ELECTRIC VALVE", filed on Aug. 9, 2021 with the China National Intellectual Property Administration, which are incorporated herein by reference in their entireties.

FIELD

The present application relates to the field of flow control valves, and in particular to an electric valve.

BACKGROUND

An electric valve is configured to control the on-off condition or switching of fluid through the rotation of a valve core. The electric valve generally includes a transmission mechanism, a shaft portion, and a valve core. The transmission mechanism is in transmission connection with the shaft portion, and the shaft portion is in transmission connection with the valve core. When a high-pressure fluid acts on the shaft portion, the pressure is transmitted to the transmission mechanism through the shaft portion, which may cause the transmission mechanism to be squeezed under a force and increase the rotational friction of the transmission mechanism, and thus increase the friction loss of the transmission mechanism, which is detrimental to the service life of the electric valve.

SUMMARY

An object of the present application is to provide an electric valve, which is conducive to reducing the friction loss of a transmission mechanism, thereby improving the service life of the electric valve.

In order to achieve the above object, the following technical solution is provided according to an embodiment of the present application.

An electric valve includes a transmission mechanism, a valve core, and a valve body assembly. The valve body assembly has a valve body cavity in which the valve core is located. The transmission mechanism is in transmission connection with the valve core. The electric valve further includes a connecting seat fixedly connected to the valve body assembly. The connecting seat has a first through-hole. The transmission mechanism includes an output shaft, one part of the output shaft is located in the first through-hole, and the other part of the output shaft is located in the valve body cavity. The electric valve further includes a limiting bracket fixedly connected to the output shaft. The limiting bracket is located at one side, towards the valve core, of the connecting seat. The limiting bracket and the connecting seat are arranged opposite to each other in an axial direction, and a predetermined gap exists between the limiting bracket and the connecting seat. In the electric valve according to the embodiment of the present application, the limiting bracket is provided on a radical outer periphery of the output shaft and is fixedly connected to the output shaft and located at one side, towards the valve core, of the connecting seat. The limiting bracket and the connecting seat are arranged opposite to each other, and the predetermined gap exists between the limiting bracket and the connecting seat. When a fluid pressure is applied to the end surface of the output shaft, the limiting bracket fixedly connected to the output shaft, under the action of pressure, can be moved towards the end of the connecting seat by a set distance until the limiting bracket abuts against the end surface of the connecting seat. The limiting bracket can transfer a part of the pressure to the connecting seat. Force balance can be realized due to the fixed connection between the connecting seat and the valve body assembly, so as to offset a part or most of the pressure generated by the fluid to be transferred to the transmission mechanism through the output shaft, which is conducive to reducing the squeezing caused by the fluid pressure between the transmission mechanism and is conducive to reducing the friction loss of the transmission mechanism, and improving the service life of the transmission mechanism, thereby improving the service life of electric valve.

DETAILED DESCRIPTION OF THE EMBODIMENTS

Figure 1:
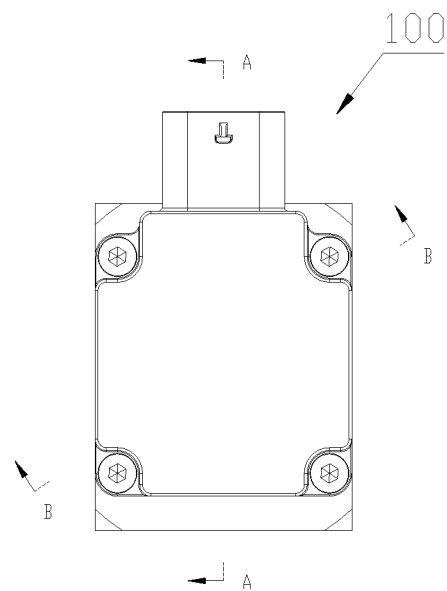
FIG. 1 is a schematic top structural view of an electric valve according to a first embodiment of the present application.

The present application is further described below in connection with the accompanying drawings and specific embodiments.

An electric valve may be applied to a vehicle thermal management system or an air conditioning system. With reference to FIGS. 1 to 12, an electric valve according to an embodiment of the present application is described. The electric valve 100 includes a control device, a valve body assembly 5 and a valve core 6. The valve body assembly 5 has a valve body cavity 51 and the valve core 6 is located in the valve body cavity 51. The control device includes a driving portion 2 and a transmission mechanism 3. The driving portion 2 is configured to output torque to the transmission mechanism 3, and the driving portion 2 is in transmission connection with the transmission mechanism 3, and the transmission mechanism 3 is in transmission connection with the valve core 6. The control device is fixedly connected to the valve body assembly 5, and the electric valve 100 is electrically connected and/or in signal connection with an external device via the control device. The fixed connection described herein includes welding, bonding, threaded connection, connection via a flange, or the like.

Figure 2:
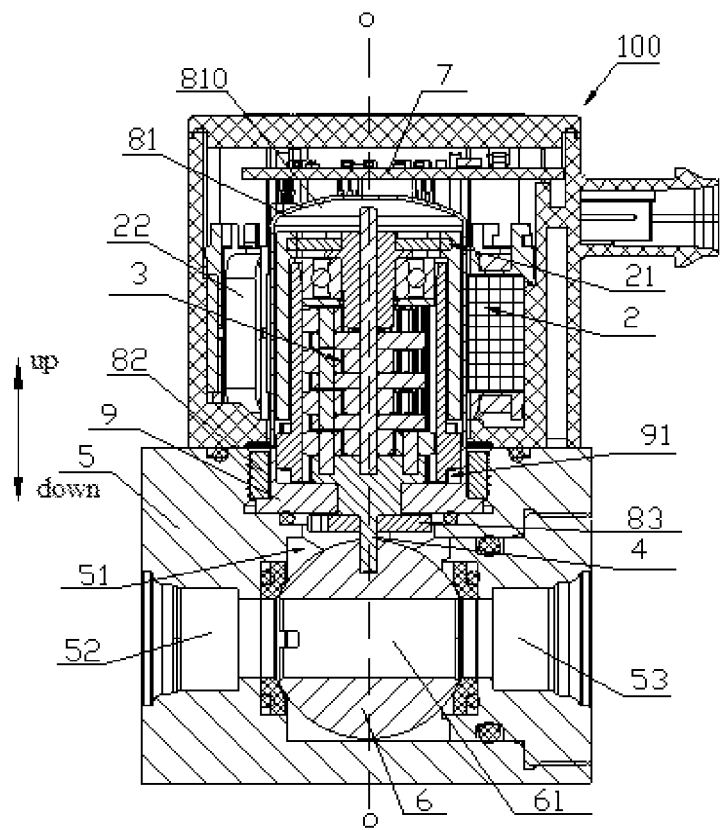
FIG. 2 is a schematic cross-sectional structural view of the electric valve shown in FIG. 1 along the A-A direction.
Figure 3:
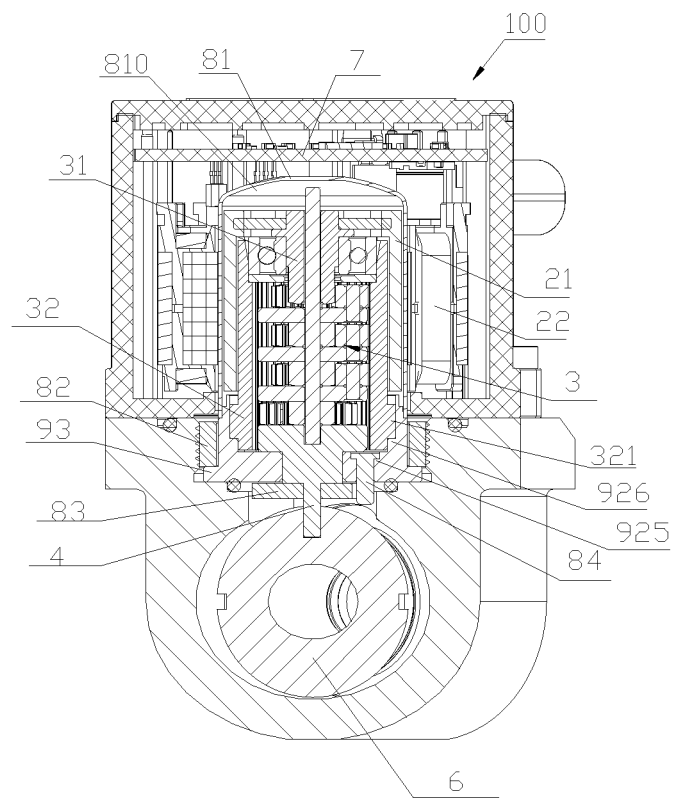
FIG. 3 is a schematic cross-sectional structural view of the electric valve shown in FIG. 1 along the B-B direction.
Figure 4:
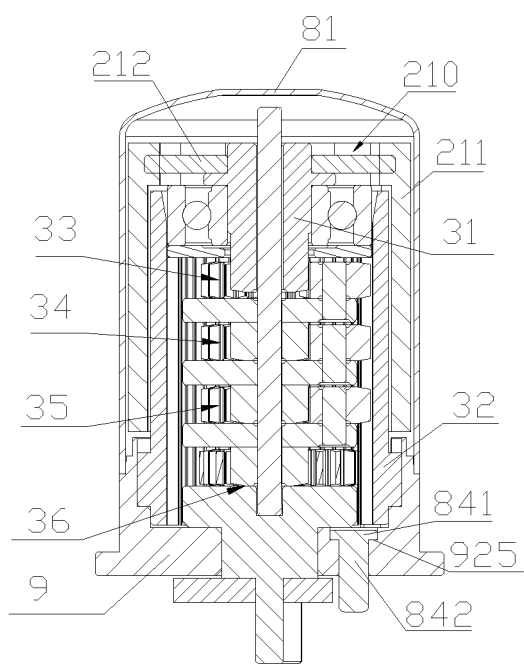
FIG. 4 is a schematic cross-sectional structural view of a driving portion, a transmission mechanism, a sleeve, and a limiting bracket and a limiting post shown in FIG. 2 or FIG. 3 fitted with a connecting seat viewed from an angle.

Referring to FIGS. 2, 3 and 4, the driving portion 2 includes a rotor assembly 21 and a stator assembly 22. The stator assembly 22 is located on an outer periphery of the rotor assembly 21. The rotor assembly 21 has a rotor cavity 210, and at least part of the transmission mechanism 3 is located in the rotor cavity 210. At least part of the transmission mechanism 3 being located in the rotor cavity 210 is conducive to reducing the axial height of the electric valve 100. The control device further includes a circuit board 7, and the stator assembly 22 is electrically connected and/or in signal connection with the circuit board 7.

The control device further includes a sleeve 81 and a connecting seat 9. At least part of the sleeve 81 is located between the rotor assembly 21 and the stator assembly 22, so as to perform an isolation function. The sleeve 81 has a sleeve cavity 810, the rotor assembly 21 is located in the sleeve cavity 810, and the sleeve 81 is fixedly connected to the connecting seat 9. In this embodiment, the sleeve 81 is fixedly connected to the connecting seat 9 by welding. The connecting seat 9 has an accommodating cavity 91, a part of the transmission mechanism 3 is located in the accommodating cavity 91, and the connecting seat 9 is fixedly connected to the valve body assembly 5.

In an embodiment, the transmission mechanism 3 is a planetary gear mechanism. Of course, in other embodiments, the transmission mechanism 3 may be other forms of transmission mechanism. Referring to FIGS. 2, 3, and 4, the transmission mechanism 3 includes a sun gear 31, a fixed ring gear 32, and at least one stage of planetary gear assembly. The transmission mechanism 3 may be provided with one or more stages of planetary gear assembly according to the requirements for a transmission ratio. For example, in this embodiment, a total of four stages of planetary gear assemblies along the axial direction of the transmission mechanism 3 are provided. The four stages of planetary gear assemblies include a first planetary gear assembly 33, a second planetary gear assembly 34, a third planetary gear assembly 35, and an output planetary gear assembly 36. The rotor assembly 21 includes a rotor magnetic ring 211 and a connection plate 212. The connection plate 212, serving as an injection moulded insert, is injection moulded to form the rotor assembly 21. The connection plate 212 is fixedly connected to the sun gear 31 or injection moulded. Along the axial direction of the electric valve 100, i.e., the O-O direction shown in FIG. 2, the first planetary gear assembly 33 is arranged closer to the sun gear 31 than the second planetary gear assembly 34, the second planetary gear assembly 34 is arranged closer to the sun gear 31 than the third planetary gear assembly 35, and the third planetary gear assembly 35 is arranged closer to the sun gear 31 than the output planetary gear assembly 36. The fixed ring gear 32 has an inner tooth portion and is arranged on the outer periphery of the planetary gear assembly. One part of the fixed ring gear 32 is located in the rotor cavity 210, another part of the fixed ring gear 32 is located in the accommodating cavity 91 of the connecting seat 9, and the fixed ring gear 32 is fixedly connected to the connecting seat 9. The first planetary gear assembly 33, the second planetary gear assembly 34, and the third planetary gear assembly 35 are structurally identical, with the first planetary gear assembly 33 gear-meshing with the sun gear 31 and the fixed ring gear 32, the second planetary gear assembly 34 gear-meshing with the first planetary gear assembly 31 and the fixed ring gear 32, and the third planetary gear assembly 35 gear-meshing with the second planetary gear assembly 36 and the fixed ring gear 32.

Figure 7:
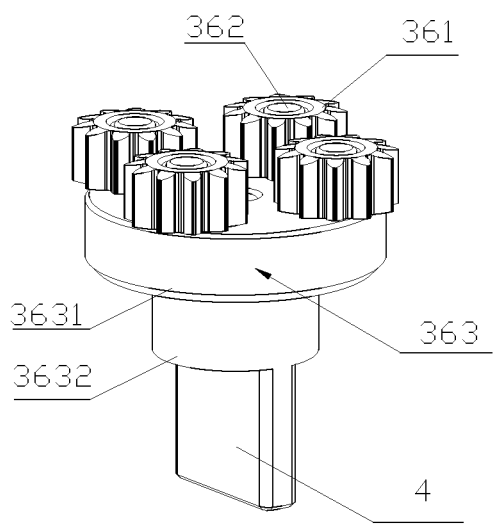
FIG. 7 is a schematic three-dimensional structural view of an output planetary gear assembly shown in FIG. 2 or FIG. 3 viewed from an angle.

Referring to FIG. 7, the output planetary gear assembly 36 includes an output planetary gear 361, a positioning shaft 362, and an output shaft 363. The output planetary gear 361 is located on the outer periphery of the positioning shaft 362, the output planetary gear 361 is in gear-meshing with the third planetary gear assembly 35, and the output planetary gear 361 is in gear-meshing with the fixed ring gear 32, and the positioning shaft 362 and the output shaft 363 may be injection-moulded as one piece or fixed to each other by assembling. In this embodiment, the positioning shaft 362 and the output shaft 363 are fixed to each other by assembling. The output shaft 363 includes a first stepped portion 3631, a second stepped portion 3632, and a shaft portion 4. In combination with FIGS. 2 and 3, in the axial direction of the electric valve, the second stepped portion 3632 is closer to the valve core 6 than the first stepped portion 3631, the shaft portion 4 is closer to the valve core 6 than the second stepped portion 3632, the first stepped portion 3631 has a width in a radial direction greater than a width of the second stepped portion 3632 in the radial direction, and the shaft portion 4 has a width in the radial direction less than a width of the second stepped portion 3632 in the radial direction. Part of the output shaft 363 is located in the accommodating cavity 91 of the connecting seat 9, and the output shaft 363 partially passes through the connecting seat 9 and is connected to the valve core 6 via the shaft portion 4. In this embodiment, the valve core 6 includes a spherical surface or a spherical-like surface. Of course, in other embodiments, the valve core 6 may be of other shapes, such as cylindrical, dome-shaped, conical, and needle-shaped. The valve core 6 has a hole passage 61 extending through the valve core, and the valve body assembly 5 includes at least two flow channels 52, 53. After the circuit board 7 controls the stator assembly 22 to be energized, the stator assembly 22 generates an excitating magnetic field. The rotor assembly 21, under the excitation of the magnetic force, drives the sun gear 31 to rotate, the sun gear 31 drives the first planetary gear assembly 33 to rotate, the first planetary gear assembly 33 drives the second planetary gear assembly 34 to rotate, and the second planetary gear assembly 34 drives the third planetary gear assembly 35 to rotate, the third planetary gear assembly 35 drives the output planetary gear 361 to rotate, and the output planetary gear 361 drives the output shaft 363 through the positioning shaft 362. The shaft portion 4 of the output shaft 363 is in transmission connection with the valve core 6, and the rotation of the shaft portion 4 drives the valve core 6 to rotate. With the rotation of the valve core 6, the hole passage 61 of the valve core 6 is able to be in communication or not in communication with the flow channels 52, 53 of the valve body assembly 5, thereby controlling the on-off condition of the fluid by the electric valve. In this embodiment, the electric valve 100 is a two-way valve with two flow channels. Of course, in other embodiments, alternatively, the electric valve may be a three-way valve, a four-way valve, or other multi-way valve. That is, the number of the flow channels of the valve body assembly is three, four or more. By the rotation of the valve core 6, two or more of the flow channels can be communicated with each other, thereby controlling the switching of the fluid by the electric valve.

Figure 9:
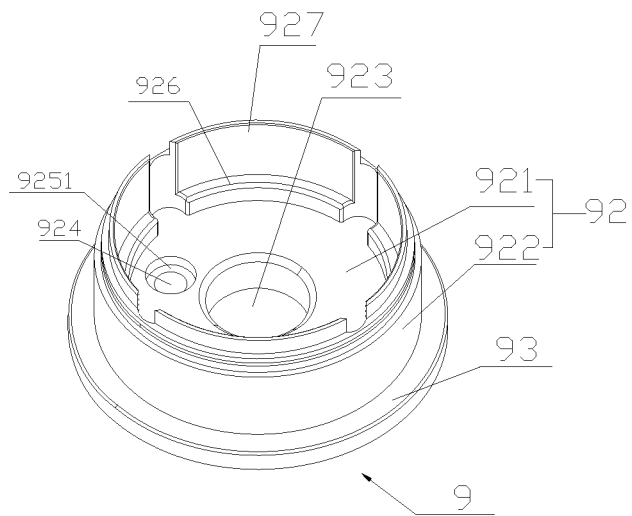
FIG. 9 is a schematic three-dimensional structural view of the connecting seat shown in FIG. 5 viewed from an angle.
Figure 10:
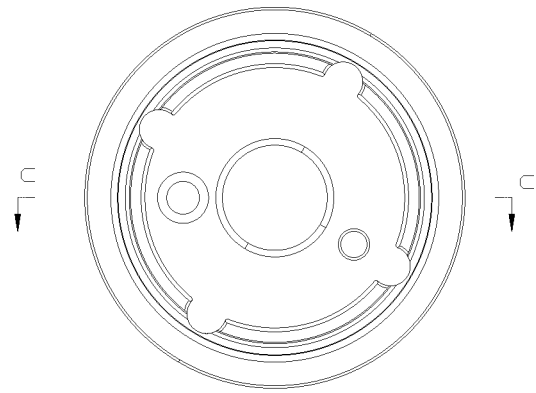
FIG. 10 is a schematic top structural view of the connecting seat shown in FIG. 9.
Figure 11:
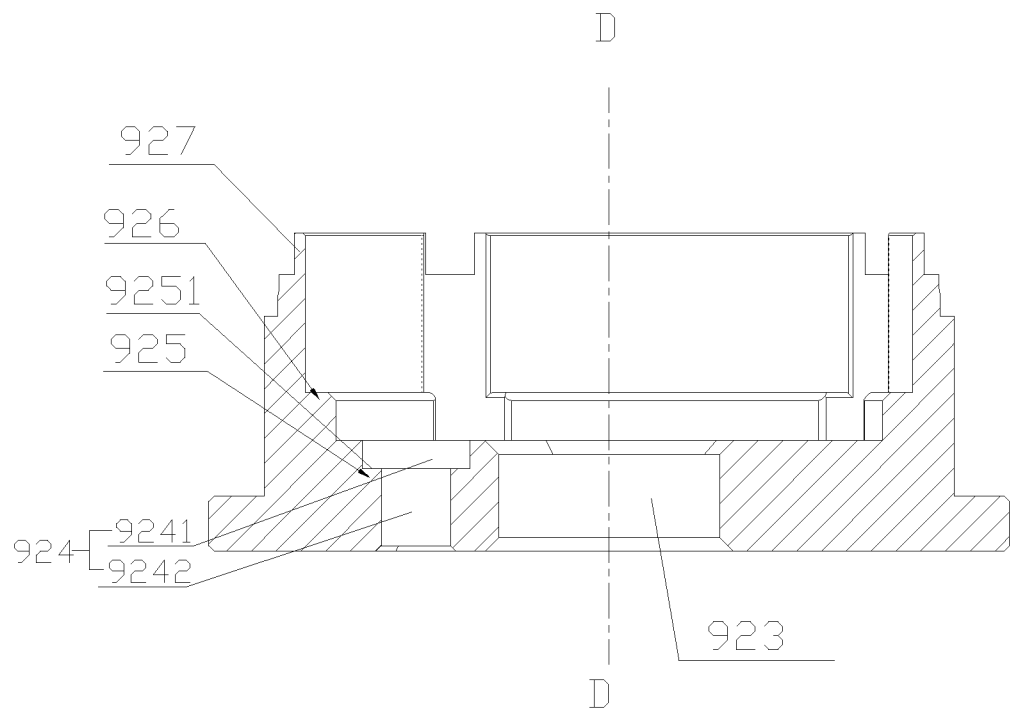
FIG. 11 is a schematic cross-sectional structural view of the connecting seat shown in FIG. 10 along the C-C direction.

Referring to FIGS. 9 to 11, the connecting seat 9 includes a main body portion 92 and a first flange portion 93, the first flange portion 93 extends outwardly in the radial direction from an outer periphery of a side wall of the main body portion 92, and the main body portion 92 is integrally machined and formed with the first flange portion 93. The main body portion 92 includes a bottom portion 921 and a sidewall 922. The main body portion 92 forms the accommodating cavity 91. The accommodating cavity 91 is located in an inner wall of the sidewall 922 and above the bottom portion 921. The bottom portion 921 has a first through-hole 923 as one opening of the accommodating cavity 91. The first through-hole 923 extends through the bottom portion 921 in the axial direction and located in the middle of the bottom portion 921.

As shown in FIGS. 2 and 3, the electric valve 100 further includes a compression nut 82. The compression nut 82 is mounted on a radial outer periphery of a side wall of the main body portion 92 of the connecting seat 9, and the compression nut 82 abuts against one end surface of the first flange portion 93. Assuming up and down directions as shown in FIG. 2, in the present embodiment, the compression nut 82 abuts against an upper surface of the first flange portion 93, and the compression nut 82 is in threaded connection with the body assembly 5, so that the connecting seat 9 is fixedly connected to the valve body assembly 5. The connecting seat 9 and the fixed ring gear 32 may be fixedly connected to each other by welding, riveting, or the like.

In conjunction with FIGS. 5, 6, and 9 to 11, the first stepped portion 3631 of the output shaft 363 is located in the accommodating cavity 91 of the connecting seat 9 and abuts against the bottom portion 921, the second stepped portion 3632 of the output shaft 363 has a height of $h_1$ in the axial direction of the electric valve, and the first through-hole 923 has a depth of $h_2$ along the axial direction of the electric valve. The height of the second stepped portion 3632 of the output shaft 363 along the axial direction of the electric valve is greater than the depth of the first through-hole 923 along the axial direction of the electric valve, i.e., $h_1 > h_2$. Therefore, one part of the second stepped portion 3632 is located within the first through-hole 923, another part of the second stepped portion 3632 passes through the first through-hole 923 and protrudes out of the bottom surface of the bottom portion 921, and the protruded part is located in the valve body cavity 51. The second stepped portion 3632 located in the valve body cavity 51 has a height of $h_1-h_2$ in the axial direction of the electric valve, where $h_1-h_2$ ranges from 0.1 mm to 0.2 mm.

Figure 5:
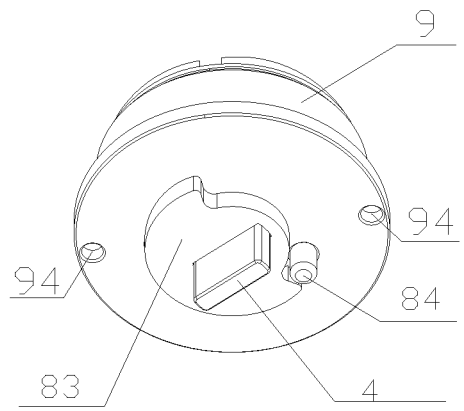
FIG. 5 is a schematic three-dimensional structural view of the connecting seat shown in FIG. 9 fitted with an output shaft, the limiting bracket, and the limiting post viewed from an angle.
Figure 6:
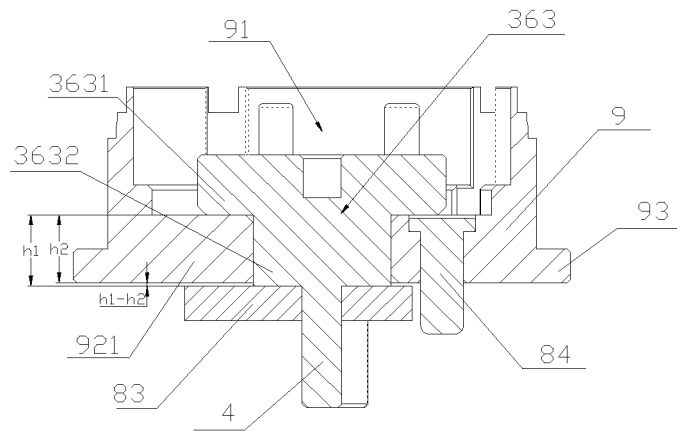
FIG. 6 is a schematic cross-sectional structural view of the structure shown in FIG. 5.
Figure 8:
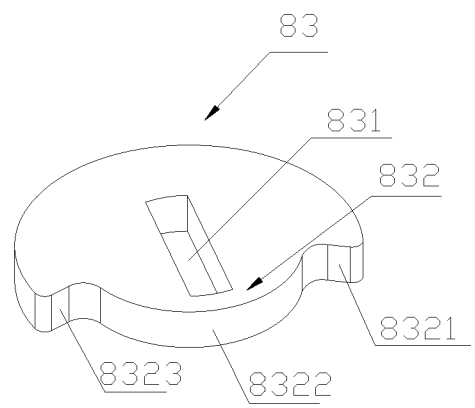
FIG. 8 is a schematic three-dimensional structural view of the limiting bracket shown in FIG. 5 viewed from an angle.

Referring to FIGS. 5 and 8, the electric valve 100 further includes a limiting bracket 83 fixedly connected to the shaft portion 4. It should be noted here that the limiting bracket 83 and the shaft portion 4 may be separate structures, which are fixedly connected to each other by welding, fastening, or other means. The limiting bracket 83 and the shaft portion 4 may be of a one-piece structure and thus be fixedly connected to each other. The limiting bracket 83 is located at one side, closer to the valve core 6, of the connecting seat 9, and the limiting bracket 83 and the connecting seat 9 are arranged opposite to each other in the axial direction. That being arranged opposite to each other refers to that the outer diameter of the limiting bracket 83 is greater than the aperture of the first through-hole 923, and part of the limiting bracket 83 that is greater than the aperture of the first through-hole 923 is arranged opposite to a corresponding part of the connecting seat 9. The limiting bracket 83 has a mounting hole 831, and the mounting hole 831 is provided axially and extends through the limiting bracket 83. One part of the shaft portion 4 is located within the mounting hole 831 of the limiting bracket 83, and another part of the shaft portion 4 passes through the mounting hole 831 to be connected to the valve core 6. The shape of the mounting hole 831 is the same as the shape of the part of the shaft portion 4 located within the mounting hole 831, and the overall dimensions of the mounting hole 831 are slightly greater than the overall dimensions of the shaft portion 4. For example, the length of the mounting hole 831 is greater than the length of the shaft portion 4 by 0.02 mm, and the width of the mounting hole 831 is greater than the width of the shaft portion 4 by 0.02 mm, so that the shaft portion 4 is able to pass through the limiting bracket 83. One part of an upper end surface of the limiting bracket 83 abuts against the second stepped portion 3632 of the output shaft 363, another part of the upper end surface of the limiting bracket 83 does not abut against the second stepped portion 3632 of the output shaft 363, and the lower end of the limiting bracket 83 is fixed to the shaft portion 4 by welding. In this embodiment, the mounting hole 831 is substantially a rectangular solid, a lower end surface of the mounting hole 831 is substantially rectangular, and the lower end surface includes two long edges and two short edges in parallel. The two long edges in parallel of the limiting bracket 83 may be fixed to the shaft portion 4 by laser welding. Of course, in order to reinforce the limiting bracket 83 and the shaft portion 4, the two short edges in parallel may be fixed to the shaft portion 4 by laser welding. That the limiting bracket 83 and the shaft portion 4 being fixed to each other by assembling and welding is more reliable than the limiting bracket 83 and the shaft portion 4 being fixed to each other by close-fitting, which is conducive to reducing the risk of fixing failure of the limiting bracket 83 and extending the service life of the limiting bracket 83. It should be understood that the mounting hole 831 may be of other structures such as cylindrical, and is not limited to the rectangular solid structure in the embodiment.

Since the height $h_1$ of the second stepped portion 3632 of the output shaft 363 in the axial direction of the electric valve is greater than the depth $h_2$ of the first through-hole in the axial direction of the electric valve, one part of the upper end surface of the limiting bracket 83 abuts against the second stepped portion 3632 of the output shaft 363, and another part of the upper end surface of the limiting bracket 83 does not abut against the second stepped portion 3632 of the output shaft 363. Therefore, the part of the upper end surface of the limiting bracket 83 that does not abut against the second stepped portion 3632 of the output shaft 363 is arranged opposite to an end surface, closer to the valve core 6, of the connecting seat 9, i.e., a lower end surface of the connecting seat 9, and there is a gap between the part of the upper end surface and the lower end surface of the connecting seat 9. The size of the gap is $h_1-h_2$, which ranges from 0.1 mm to 0.2 mm usually. A predetermined gap exists between the limiting bracket 83 and the connecting seat 9, which is capable of reducing the frictional resistance force of the limiting bracket 83 when the limiting bracket 83 is rotating. When the fluid flowing through the electric valve is a high-pressure fluid, the fluid in the valve body cavity 51 acting on the end surface of the shaft portion 4 may generate an axial upward pressure on the shaft portion 4. Under the action of the pressure, the limiting bracket 83 fixedly connected to the shaft portion 4, as well as the output shaft 363, can be moved upward by a predetermined distance until the limiting bracket 83 abuts against the lower end surface of the connecting seat 9. The predetermined distance is equal to the above gap $h_1$-$h_2$. When the axial pressure is large, the limiting bracket 83 abuts against the lower end surface of the connecting seat 9, the limiting bracket 83 can transfer part of the pressure to the connecting seat 9. Since the connecting seat 9 is fixedly connected to the valve body assembly 5 to realize a force balance, part or most of the pressure generated by the high-pressure fluid to be transferred to the planetary gear assemblies 33 to 36 at the stages via the output shaft 363 is offset, which is conducive to reducing the squeezing caused by fluid pressure among the planetary gear assemblies at the stages, reducing the friction loss of the planetary gear assemblies, and improving the service life of the transmission mechanism, thereby improving the service life of the electric valve.

Referring to FIG. 8, the limiting bracket 83 further includes a stop portion 832. The stop portion 832 includes a first stop surface 8321, a second stop surface 8323, and a non-stop surface 8322. In this embodiment, the non-stop surface 8322 is a curved surface, the first stop surface 8321 and the second stop surface 8323 are planar surfaces, and the first stop surface 8321 is connected to one end of the non-stop surface 8322 either directly or through a connection curved surface, the second stop surface 8323 is connected to the other end of the non-stop surface 8322 either directly or through a connection curved surface. The first stop surface 8321 is not directly connected to the second stop surface 8323. In FIG. 8, the first stop surface 8321, the non-stop surface 8322, and the second stop surface 8323 are parts of an annular peripheral wall of the stop portion 832.

Figure 12:
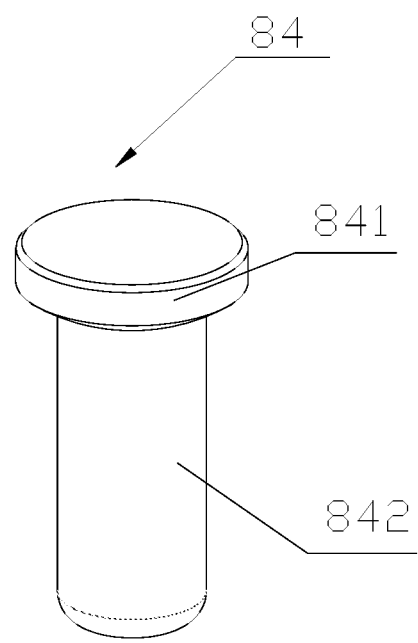
FIG. 12 is a schematic three-dimensional structural view of the limiting post shown in FIG. 5 viewed from an angle.

The electric valve 100 further includes a limiting post 84. Referring to FIG. 12, the limiting post 84 is substantially T-shaped. The limiting post 84 includes a head portion 841 and a rod portion 842. The head portion 841 has a diameter greater than the diameter of the rod portion 842. Referring to FIGS. 9 and 11, the connecting seat 9 further has a mounting cavity 924. The mounting cavity 924 is configured to accommodate the limiting post 84. The mounting cavity 924 extends through the bottom portion 921 in the axial direction. The mounting cavity 924 is further away from the central axis D-D of the connecting seat 9 than the first through-hole 923. The mounting cavity 924 includes a first mounting cavity 9241 and a second mounting cavity 9242 axially arranged. The first mounting cavity 9241 is in communication with the second mounting cavity 9242. The second mounting cavity 9242 is closer to the valve core 6 than the first mounting cavity 9241, and an inner diameter of the first mounting cavity 9241 is larger than an inner diameter of the second mounting cavity 9242. The connecting seat 9 includes a third stepped portion 925 serving as part of a cavity wall forming the mounting cavity 924. With a stepped surface 9251 of the third stepped portion 925 serving as a boundary, a part above the stepped surface 9251 is referred to as the first mounting cavity 9241, and a part below the stepped surface 9251 is referred to as the second mounting cavity 9242. The head portion 841 of the limiting post 84 is located in the first mounting cavity 9241, and the head portion 841 of the limiting post 84 abuts against the third stepped portion 925. The head portion 841 of the limiting post 84 does not exceed beyond an opening at one end of the first mounting cavity 9241 away from the valve body assembly, i.e., the opening at an upper end of the first mounting cavity 9241, to prevent the limiting post 84 from affecting the rotation of the output shaft 363. The head portion 841 has a diameter smaller than the inner diameter of the first mounting cavity 9241, and the head portion is in clearance fit with a cavity wall forming the first mounting cavity. Part of the rod portion 842 of the limiting post 84 is located in the second mounting cavity 9242. The rod portion 842 has a diameter slightly greater than the inner diameter of the second mounting cavity 9242. The part, located in the second mounting cavity 9242, of the rod portion 842 is in interference fit with the cavity wall forming the second mounting cavity, i.e., the third stepped portion 925. The remaining part of the rod portion 842 passes through the second mounting cavity 9242 and is located in the valve body cavity 51. When the limiting bracket 83 is rotated, the part of the rod portion 842, that passes through the second mounting cavity 9242 and is located in the valve body cavity 51, is able to abut against the first stop surface 8321 or the second stop surface 8323 of the limiting bracket 83, and the limiting post 84 is not in contact with the non-stop surface 8322, so as to be able to limit the angle of rotation of the limiting bracket 83, and thus limit the angle of rotation of the shaft portion 4. The limiting post 84 may be mounted by pressing the limiting post 84 downwardly from the upper end of the mounting cavity 924, so that the head portion 841 of the limiting post 84 abuts against the cavity wall forming the mounting cavity, i.e., the third stepped portion 925 of the connecting seat 9, and the third stepped portion 925 is able to restrict the movement of the limiting post 84 in a direction proximate to the valve body assembly 5 and reduce the risk of the limiting post 84 falling into the valve body cavity 51, thereby improving the service life of the limiting post.

In addition, as shown in FIG. 5, the connecting seat 9 further includes a positioning hole 94, and the valve body assembly 5 is provided with a corresponding positioning post (not shown in the accompanying drawings). The positioning post and the positioning hole 94 are in fit with each other to perform a function of positioning. As shown in FIGS. 4 and 9, the connecting seat 9 further includes a fourth stepped portion 926, the fourth stepped portion 926 is located on the inner periphery of the side wall of the connecting seat 9. The third stepped portion 925 is closer to the valve core 6 in the axial direction of the electric valve than the fourth stepped portion 926. The connecting seat 9 further includes a riveting portion 927. The riveting portion 927 is located at an upper end of the main body portion 92 and is configured for the fixing connection with the fixed ring gear 32. The connecting seat 9 may be a metal part, for example, with a desired structure and shape obtained based on stainless steel by cutting and machining. As shown in FIGS. 3 and 9, the fixed ring gear 32 has a second flange portion 321. The second flange portion 321 is located at one end, closer to the valve body assembly 5, of the fixed ring gear 32, and the second flange portion 321 extends outwardly in the radical direction from the outer peripheral wall of the fixed ring gear 32. A lower surface of the second flange portion 321 of the fixed ring gear 32 abuts against the fourth stepped portion 926. The outer peripheral surface of the second flange portion 321 abuts against the side wall 922 of the main body portion of the connecting seat. The riveting portion 927 of the connecting seat is fixed to the fixed ring gear 32 by riveting.

It should be noted that the above embodiments are merely used to illustrate the present application and are not intended to limit the technical solutions described in the present application. Although the present application has been described herein in detail with reference to the above embodiments, it should be understood that modifications or equivalent substitutions to the present application can still be made by those skilled in the art, and all technical solutions and improvements thereto that do not depart from the spirit and scope of the present application shall be covered by the scope of the claims of the present application.

What is claimed is:

1. An electric valve, comprising a transmission mechanism, a valve core, and a valve body assembly, wherein the valve body assembly has a valve body cavity in which the valve core is located, and the transmission mechanism is in transmission connection with the valve core, wherein
the electric valve further comprises a connecting seat fixedly connected to the valve body assembly, the connecting seat has a first through-hole, the transmission mechanism comprises an output shaft, one part of the output shaft is located in the first through-hole, and another part of the output shaft is located in the valve body cavity, and
the electric valve further comprises a limiting bracket fixedly connected to the output shaft, the limiting bracket is located at one side, closer to the valve core, of the connecting seat, the limiting bracket and the connecting seat are arranged opposite to each other in an axial direction, and a predetermined gap exists between the limiting bracket and the connecting seat,
the output shaft comprises a first stepped portion and a second stepped portion, the second stepped portion is closer to the valve core than the first stepped portion, the first stepped portion has a width in a radial direction greater than a width of the second stepped portion in the radial direction, one part of the second stepped portion is located in the first through-hole, another part of the second stepped portion is located in the valve body cavity.

2. The electric valve according to claim 1, wherein the first stepped portion abuts against one end surface of the connecting seat away from the valve core, and the limiting bracket abuts against the second stepped portion.

3. The electric valve according to claim 2, wherein the second stepped portion has a length of $h_1$ along the axial direction of the electric valve, the first through-hole has a depth of $h_2$ along the axial direction of the electric valve, and the predetermined gap is defined as $h_1$-$h_2$, and $h_1$-$h_2$ satisfies the following relationship that $h_1$-$h_2$ ranges from 0.1 mm to 0.2 mm.

4. The electric valve according to claim 3, wherein the connecting seat comprises a main body portion, the main body portion comprises a bottom portion and a side wall, the connecting seat has an accommodating cavity, the accommodating cavity is located in an inner wall of the side wall and above the bottom portion, the first through-hole has an opening at the bottom portion, the transmission mechanism comprises a fixed ring gear and at least one stage of planetary gear assembly, the fixed ring gear and the planetary gear assembly are at least partially located in the accommodating cavity, and the fixed ring gear is fixedly connected to the connecting seat.

5. The electric valve according to claim 4, wherein the output shaft comprises a shaft portion, the shaft portion is closer to the valve core than the second stepped portion, the limiting bracket has a mounting hole extending through the limiting bracket in the axial direction, part of the shaft portion is located in the mounting hole and is in transmission connection with the valve core, and the limiting bracket is fixed to the shaft portion by welding.

6. The electric valve according to claim 5, wherein the electric valve further comprises a limiting post, the limiting post cooperates with the limiting bracket to limit an angle of rotation of the shaft portion, the connecting seat has a mounting cavity extending through the bottom portion in the axial direction, the mounting cavity is further away from the center of the connecting seat than the first through-hole, the limiting post comprises a head portion and a rod portion, the head portion has a diameter greater than a diameter of the rod portion, the rod portion is closer to the valve core than the head portion, the head portion is located in the mounting cavity, and the rod portion is at least partially located in the valve body cavity.

7. The electric valve according to claim 6, wherein the limiting bracket comprises a stop portion comprising a first stop surface, a second stop surface and a non-stop surface, the first stop surface is connected to one end of the non-stop surface, the second stop surface is connected to the other end of the non-stop surface, and the part, located in the valve body cavity, of the rod portion is configured to abut against the first stop surface or the second stop surface of the limiting bracket.

8. The electric valve according to claim 6, wherein the mounting cavity comprises a first mounting cavity and a second mounting cavity which are arranged axially, the second mounting cavity is closer to the valve core than the first mounting cavity, the first mounting cavity has an inner diameter greater than an inner diameter of the second mounting cavity, the connecting seat comprises a third stepped portion, the third stepped portion serves as part of a cavity wall forming the mounting cavity, the head portion is located in the first mounting cavity and abuts against the third stepped portion, the head portion does not exceed beyond an opening at one end of the first mounting cavity away from the valve body assembly, part of the rod portion is located in the second mounting cavity, and the rod portion is in interference fit with the third stepped portion.

9. The electric valve according to claim 4, wherein the connecting seat comprises a first flange portion extending outwardly in a radial direction from an outer periphery of a side wall of the main body portion, and the electric valve further comprises a compression nut mounted on a radial outer periphery of the side wall of the main body portion, the compression nut abuts against one end surface of the first flange portion, and the compression nut is in threaded connection with the valve body assembly.

10. The electric valve according to claim 8, wherein the connecting seat further comprises a positioning hole, the valve body assembly is provided with a corresponding positioning post, the positioning post is in fit with the positioning hole, wherein
the connecting seat further comprises a fourth stepped portion, the fourth stepped portion is located on an inner periphery of the side wall of the main body portion, the third stepped portion is closer to the valve core than the fourth stepped portion along the axial direction of the electric valve; and wherein
the connecting seat further comprises a riveting portion, the riveting portion is located at one end, away from the valve core, of the main body portion, the fixed ring gear has a second flange portion, the second flange portion is located at one end, closer to the valve body assembly, of the fixed ring gear, the second flange portion extends outwardly in the axial direction from an outer peripheral wall of the fixed ring gear, the second flange portion of the fixed ring gear has an end surface abutting against the fourth stepped portion, the second flange portion has an outer peripheral surface abutting against the side wall of the main body portion, and the riveting portion of the connecting seat is fixed to the fixed ring gear by riveting.

11. The electric valve according to claim 2, wherein the connecting seat comprises a main body portion, the main body portion comprises a bottom portion and a side wall, the connecting seat has an accommodating cavity, the accommodating cavity is located in an inner wall of the side wall and above the bottom portion, the first through-hole has an opening at the bottom portion, the transmission mechanism comprises a fixed ring gear and at least one stage of planetary gear assembly, the fixed ring gear and the planetary gear assembly are at least partially located in the accommodating cavity, and the fixed ring gear is fixedly connected to the connecting seat.

12. The electric valve according to claim 3, wherein the connecting seat comprises a main body portion, the main body portion comprises a bottom portion and a side wall, the connecting seat has an accommodating cavity, the accommodating cavity is located in an inner wall of the side wall and above the bottom portion, the first through-hole has an opening at the bottom portion, the transmission mechanism comprises a fixed ring gear and at least one stage of planetary gear assembly, the fixed ring gear and the planetary gear assembly are at least partially located in the accommodating cavity, and the fixed ring gear is fixedly connected to the connecting seat.

13. The electric valve according to claim 7, wherein the mounting cavity comprises a first mounting cavity and a second mounting cavity which are arranged axially, the second mounting cavity is closer to the valve core than the first mounting cavity, the first mounting cavity has an inner diameter greater than an inner diameter of the second mounting cavity, the connecting seat comprises a third stepped portion, the third stepped portion serves as part of a cavity wall forming the mounting cavity, the head portion is located in the first mounting cavity and abuts against the third stepped portion, the head portion does not exceed beyond an opening at one end of the first mounting cavity away from the valve body assembly, part of the rod portion is located in the second mounting cavity, and the rod portion is in interference fit with the third stepped portion.

* * * * *